(12) United States Patent
Halawani et al.

(10) Patent No.: US 12,491,956 B2
(45) Date of Patent: Dec. 9, 2025

(54) ADHESION DEVICES FOR TRANSPORT ASSEMBLIES TO ENGAGE NON-METALLIC SURFACES

(71) Applicant: SAUDI ARABIAN OIL COMPANY, Dhahran (SA)

(72) Inventors: Abdulwahab Halawani, Thuwal (SA); Sahejad Patel, Thuwal (SA); Maha Nour, Thuwal (SA); Ayman Amer, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 447 days.

(21) Appl. No.: 18/192,423

(22) Filed: Mar. 29, 2023

(65) Prior Publication Data

US 2024/0326517 A1   Oct. 3, 2024

(51) Int. Cl.
| | |
|---|---|
| *B62D 55/265* | (2006.01) |
| *B60B 15/00* | (2006.01) |
| *B60B 19/00* | (2006.01) |
| *B62D 55/20* | (2006.01) |
| *B62D 55/26* | (2006.01) |

(52) U.S. Cl.
CPC ............ *B62D 55/265* (2013.01); *B60B 15/00* (2013.01); *B60B 19/003* (2013.01); *B60B 19/006* (2013.01); *B62D 55/20* (2013.01); *B62D 55/26* (2013.01)

(58) Field of Classification Search
CPC ..... B60B 15/00; B60B 19/003; B60B 19/006; B62D 55/265
See application file for complete search history.

(56) References Cited

U.S. PATENT DOCUMENTS

| | | | |
|---|---|---|---|
| 7,175,723 | B2 | 2/2007 | Jones |
| 7,520,356 | B2 | 4/2009 | Sadegh et al. |
| 10,307,941 | B2 | 6/2019 | Sitti et al. |
| 11,447,248 | B2 | 9/2022 | Weeks et al. |
| 2014/0368993 | A1 | 12/2014 | Sun et al. |
| 2016/0296045 | A1 | 10/2016 | Frumkin |
| 2020/0174478 | A1 | 6/2020 | Abdellatif et al. |
| 2022/0371230 | A1 | 11/2022 | Kerst et al. |

*Primary Examiner* — Jason R Bellinger
(74) *Attorney, Agent, or Firm* — Leason Ellis LLP (57) ABSTRACT

Adhesion devices for transport assemblies are configured to engage non-metallic surfaces. The transport assemblies can be wheels, such as omni-directional wheels, or can be a tractor tread assembly. The transport assembly is configured to move adjacent to a non-metallic surface of a structure. The transport assembly comprises an outer surface disposed adjacent to the non-metallic surface as the transport assembly moves, and a plurality of adhesion devices are each mounted to the outer surface and extend at least in a normal direction away from the outer surface. Each adhesion device is responsive to proximity to the non-metallic surface to adhere to the non-metallic surface. The adhesion devices in one or more embodiments include a Van der Waals-type adhesion device, a micro spine-type adhesion device, a suction cup-type adhesion device, or a combination of such devices.

20 Claims, 8 Drawing Sheets

ADHESION DEVICES FOR TRANSPORT ASSEMBLIES TO ENGAGE NON-METALLIC SURFACES

FIELD OF THE DISCLOSURE

The present disclosure relates generally to wheels and other transport assemblies engaging surfaces, and, more particularly, to adhesion devices for transport assemblies to engage non-metallic surfaces.

BACKGROUND OF THE DISCLOSURE

In crawling systems, such as a crawler or an unmanned aerial vehicle (UAV) used to inspect structures, including oil and gas pipelines, the crawling systems can be employed to move over a surface of the structures. Since a pipeline or other structures can have curved surfaces or surfaces extending vertically, the crawling systems need to move adjacent to such surfaces in any orientation. In some crawling systems, transport assemblies are employed. Such transport assemblies can include wheels and tractor tread assemblies.

In order to move adjacent to surfaces in any orientation, the crawling systems need to adhere to the surfaces. When the surface is metallic, the crawling systems can use magnetic or electromagnetic adhesion mechanisms to adhere to such metallic surfaces. However, magnetic or electromagnetic adhesion mechanisms are ineffective when the surface of a structure is non-magnetic.

SUMMARY OF THE DISCLOSURE

According to an embodiment consistent with the present disclosure, adhesion devices for transport assemblies are disclosed which engage non-metallic surfaces.

In an embodiment, a transport assembly is configured to move adjacent to a non-metallic surface of a structure. The transport assembly comprises an outer surface disposed adjacent to the non-metallic surface as the transport assembly moves, and a plurality of adhesion devices each mounted to the outer surface and extending at least in a normal direction away from the outer surface. Each adhesion device, responsive to proximity to the non-metallic surface, is configured to adhere to the non-metallic surface. The plurality of adhesion devices include a first adhesion device and a second adhesion device different from the first adhesion device. The first and second adhesion devices are selected from the group consisting of: a Van der Waals-type adhesion device, a micro spine-type adhesion device, and a suction cup-type adhesion device.

Each adhesion device can be configured to releasably adhere to the non-metallic surface. A top surface of the Van der Waals-type adhesion device can be trapezoidally shaped. Alternatively, the top surface of the Van der Waals-type adhesion device can have anisotropic adhesion in a single direction. In another alternative embodiment, the top surface of the Van der Waals-type adhesion device is elliptically shaped. The outer surface can be a portion of a tractor tread. Alternatively, the outer surface can be a portion of a circumferential surface of a wheel. The wheel can be an omni-directional wheel. Alternatively, the transport assembly can further comprise an inner ring disposed within the circumferential surface, wherein a magnetic member is disposed on the inner ring and configured to magnetically attract a metallic surface. The magnetic member can be a permanent magnet. Alternatively, the magnetic member can be an electromagnet.

In another embodiment, a wheel is configured to move adjacent to a non-metallic surface of a structure. The wheel comprises an outer circumferential surface disposed adjacent to the non-metallic surface as the wheel moves on the non-metallic surface. A plurality of adhesion devices are each mounted to the outer circumferential surface and extending at least in a normal direction away from the outer circumferential surface. Each adhesion device, responsive to proximity to the non-metallic surface, is configured to adhere to the non-metallic surface. The plurality of adhesion devices include a Van der Waals-type adhesion device, a micro spine-type adhesion device, and a suction cup-type adhesion device.

Each adhesion device can be configured to releasably adhere to the non-metallic surface. A top surface of the Van der Waals-type adhesion device can be trapezoidally shaped. Alternatively, a top surface of the Van der Waals-type adhesion device can have anisotropic adhesion in a single direction. In another alternative embodiment, a top surface of the Van der Waals-type adhesion device can be elliptically shaped.

In a further embodiment, a tractor tread assembly is configured to move adjacent to a non-metallic surface of a structure. The tractor tread assembly comprises a plurality of wheels, a plurality of tractor treads, and a plurality of adhesion devices. The plurality of tractor treads is configured to move about the plurality of wheels, each tractor tread having an outer planar surface disposed adjacent to the non-metallic surface as the tractor tread assembly moves. The plurality of adhesion devices are each mounted to the outer planar surface and extend at least in a normal direction away from the outer planar surface. Each adhesion device, responsive to proximity to the non-metallic surface, is configured to adhere to the non-metallic surface. The plurality of adhesion devices include a Van der Waals-type adhesion device, a micro spine-type adhesion device, and a suction cup-type adhesion device.

Each adhesion device can be configured to releasably adhere to the non-metallic surface. A top surface of the Van der Waals-type adhesion device can be trapezoidally shaped. Alternatively, a top surface of the Van der Waals-type adhesion device can be elliptically shaped.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to adhesion devices for transport assemblies to engage non-metallic surfaces. As shown in FIGS. 1-11, the adhesion devices can be mounted on the outer surface of a transport assembly such as a wheel, as shown in FIGS. 5-9 and 11-11A, or a tractor tread as shown in FIG. 10-10A.

Figure 1:
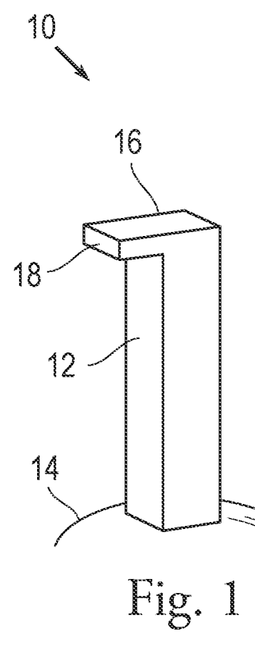
FIG. 1 is a top front side perspective view of an adhesion device, according to a first embodiment.
Figures 2, 3:
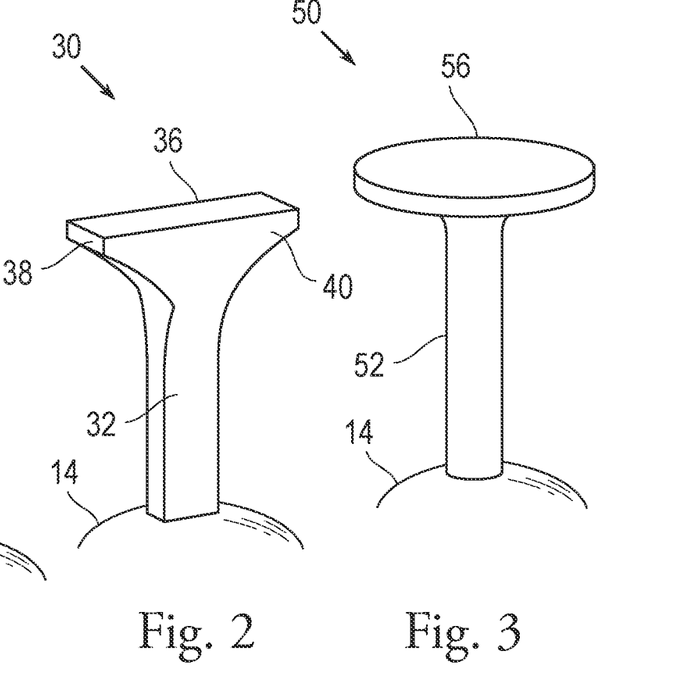
FIG. 2 is a top front side perspective view of an adhesion device, according to a second embodiment.
FIG. 3 is a top front side perspective view of an adhesion device, according to a third embodiment.

Referring to FIGS. 1-3, one type of adhesion device employs a member extending from the outer surface of the transport assembly to engage a non-metallic surface using Van der Waals attraction, with a shape and configuration that mimics the spatula pads of a gecko. As understood, a gecko's feet comprises microscopical arrays of hairs called setae. Each setae has a cluster of smaller hairs called spatulas, and each spatula is around 150 nanometers in diameter. The spatula shape, as described in FIG. 1 provides anisotropic adhesion to a surface. It is to be appreciated, however, that changing the spatula shape can yield multi directional adhesion. In this regard, the adhesion employed is to harness the Van der Waals forces to adhere wheels of a vehicle to surfaces with a combination of adhesion methods described herein, such as micro spinal claws, suction cups and magnetic forces. The particular size of the spatula, if utilized, can be varied within a range that still supports Van der Waals attraction. As well, a combination of shapes like circular or rectangular head shapes can be included as the other structure utilized for such adhesion.

Such Van der Waals attraction is a distance-dependent interaction between atoms or molecules, instead of ionic or chemical bonds, and so provides attraction without the use or reliance on magnetic properties between surfaces. The Van der Waals attraction is strong enough to allow the adhesion devices in FIGS. 1-3 to adhere to the non-metallic surface, but is weak enough to provide releasable adhesion, so that the transport assembly with such adhesion devices can releasably adhere to non-metallic surfaces as the transport assembly moves adjacent to such surfaces. In addition, the Van der Waals attraction is non-destructive in that the attraction does not disrupt or rely on ionic or chemical bonds with atoms or molecules of the non-metallic surface during adhesion. Accordingly, the integrity of non-metallic surfaces of structures, such as oil or gas pipelines, is not compromised by the transport assembly crawling on such surfaces of structures.

As shown in FIG. 1, the adhesion device 10 includes a member 12 extending in a normal or perpendicular direction from the outer surface 14 of the transport assembly, with a top portion 16 shaped so as to engage the non-metallic surface by using Van der Waals attraction. The surface 14 can be planar. Alternatively, the surface 14 can be curved. In a further embodiment, the surface 14 can be curved but can be substantially planar in a small region about the base of the member 12. In the adhesion device 10, a tab 18 extends from the top portion 16 to allow anisotropic adhesion to the non-metallic surface. A top surface of the top portion 16 can be substantially trapezoidal, including rectangular-shaped. Alternatively, the top surface of the top portion 16 can be substantially triangular, with a vertex of the triangular top portion 16 being the tab 18. Accordingly, the adhesion device 10 is a directional device configured to provide adhesion in the direction of extension of the tab 18 from the top portion 16, but no adhesion is provided in other directions relative to a longitudinal axis of the member 12.

As shown in FIG. 2, in an alternative adhesion device 30 also shaped and configured to employ Van der Waals attraction, a member 32 extends in a normal or perpendicular direction from the outer surface 14 of the transport assembly, with a top portion 36 engaging the non-metallic surface using Van der Waals attraction. The surface 14 can be planar. Alternatively, the surface 14 can be curved. In a further embodiment, the surface 14 can be curved but can be substantially planar in a small region about the base of the member 32. In the adhesion device 10, a pair of tabs 38, 40 extend from the top portion 36 to allow bi-directional adhesion to the non-metallic surface. A top surface of the top portion 36 can be substantially trapezoidal, including rectangular-shaped. Alternatively, the top surface of the top portion 36 can be substantially kite-shaped, including rhombus-shaped, with vertices of the kite-shaped top portion 36 being the tabs 38, 40. Accordingly, the adhesion device 30 is a bi-directional device configured to provide adhesion in the directions of extension of the tabs 38, 40 from the top portion 36, but no adhesion is provided in other directions relative to a longitudinal axis of the member 32.

As shown in FIG. 3, in another alternative adhesion device 50 shaped and configured to use Van der Waals attraction, a member 52 extends in a normal or perpendicular direction from the outer surface 14 of the transport assembly, with a top portion 56 engaging the non-metallic surface using Van der Waals attraction. The surface 14 can be planar. Alternatively, the surface 14 can be curved. In a further embodiment, the surface 14 can be curved but can be substantially planar in a small region about the base of the member 52. In the adhesion device 50, a top surface of the top portion 56 has an elliptical shape, such as a circular shape, to allow multi-directional adhesion to the non-metallic surface. Accordingly, the adhesion device 50 is a multi-directional device configured to provide adhesion in all radial directions relative to a longitudinal axis of the member 52.

In the embodiments of the adhesion devices 10, 30, 50 shown in FIGS. 1-3, respectively, the adhesion devices 10, 30, 50 can be fabricated using known microscale fabrication techniques. In addition, at least the top portions 16, 36, 56 of the adhesion devices 10, 30, 50, respectively, can be fabricated from carbon nanotubes which generate the Van der Waals attraction between the top portions 16, 36, 56 and the non-metallic surfaces.

Figure 4:
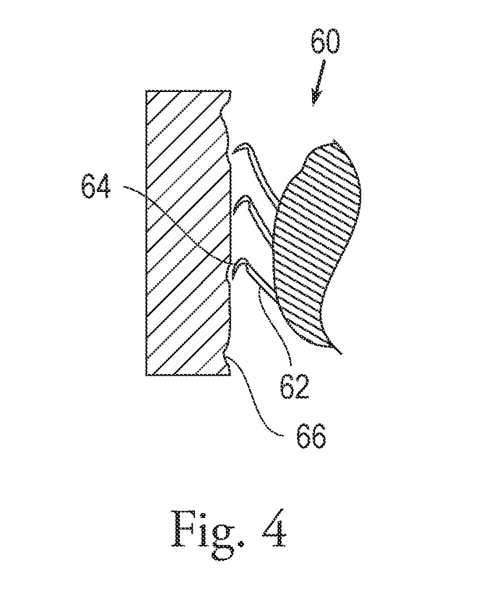
FIG. 4 is a top front side perspective view of an adhesion device, according to a fourth embodiment.

In another type of adhesion device 60, as shown in FIG. 4, at least one micro spinal claw 62 has at least one micro spine 64 extending in a generally normal or perpendicular direction from an outer surface of the adhesion device 60. The micro spine 64 is configured to releasably engage irregularities and miniscule material voids in the non-metallic surface 66 of the structure. The micro spine 64 releasably engages such voids by hooking into the voids without creating any damage to the non-metallic surface 66.

Figure 5:
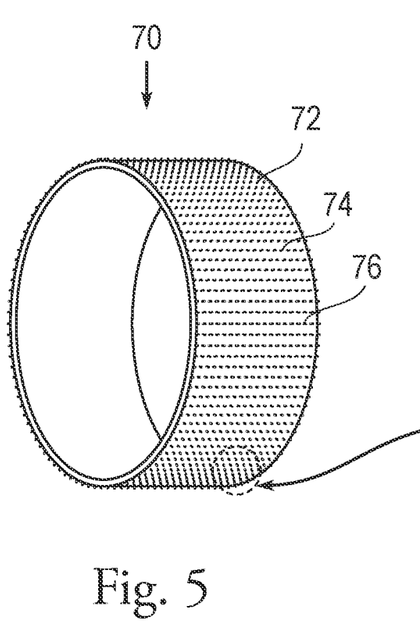
FIG. 5 is a top front side perspective view of an adhesion device, according to a fifth embodiment.
Figure 5A:
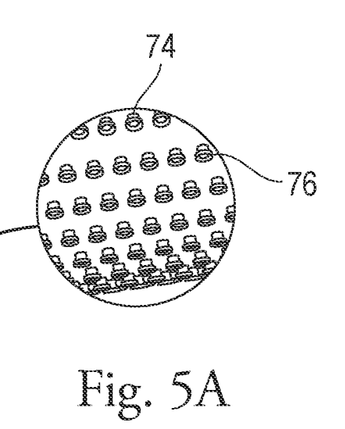
FIG. 5A is an enlarged view of a portion of the adhesion device of FIG. 5.

In a further type of adhesion device, as shown in FIGS. 5-5A, a transport assembly 70 such as a wheel has an outer surface 72 upon which at least one suction cup 74, 76 is mounted as the adhesion device. The suction cup 74, 76 extends in a normal or perpendicular direction from the outer surface 72. In operation, when the transport assembly 70 with the suction cup 74 engages a non-metallic surface, and the suction cup 74 is further pressed onto the non-metallic surface, air or other trapped gases are removed from inside the suction cup 74. Such gas removal generates a vacuum between the suction cup 74 and the non-metallic surface, which creates adhesion between the transport assembly 70 and the non-metallic surface. As the wheel is rotated or otherwise when the transport assembly 70 moves adjacent to the non-metallic surface, the portion of the transport assembly having the suction cup 74 is pulled away from the non-metallic surface. Such a pulling away action eliminates the vacuum between the suction cup 74 and the non-metallic surface, which reduces and then cancels the adhesion between the suction cup 74 and the non-metallic surface. Accordingly, the suction cup 74 provides releasable adhesion between the transport assembly 70 and the non-metallic surface. The movement of the transport assembly 70 adjacent to the non-metallic surface can then bring another suction cup 76 towards the non-metallic surface to engage and releasably adhere to the non-metallic surface. Such additional engagement of other suction cups to the non-metallic surface allows the transport assembly 70 to continuously and releasably adhere to the non-metallic surface as the transport assembly 70 moves adjacent to the non-metallic surface.

Figure 6:
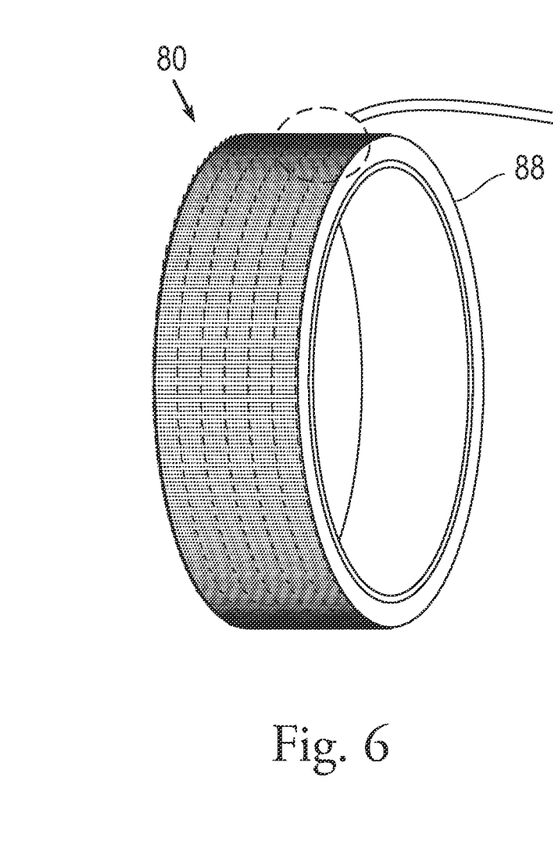
FIG. 6 is a top front side perspective view of a wheel with adhesion devices as shown in FIGS. 1-5.
Figure 6A:
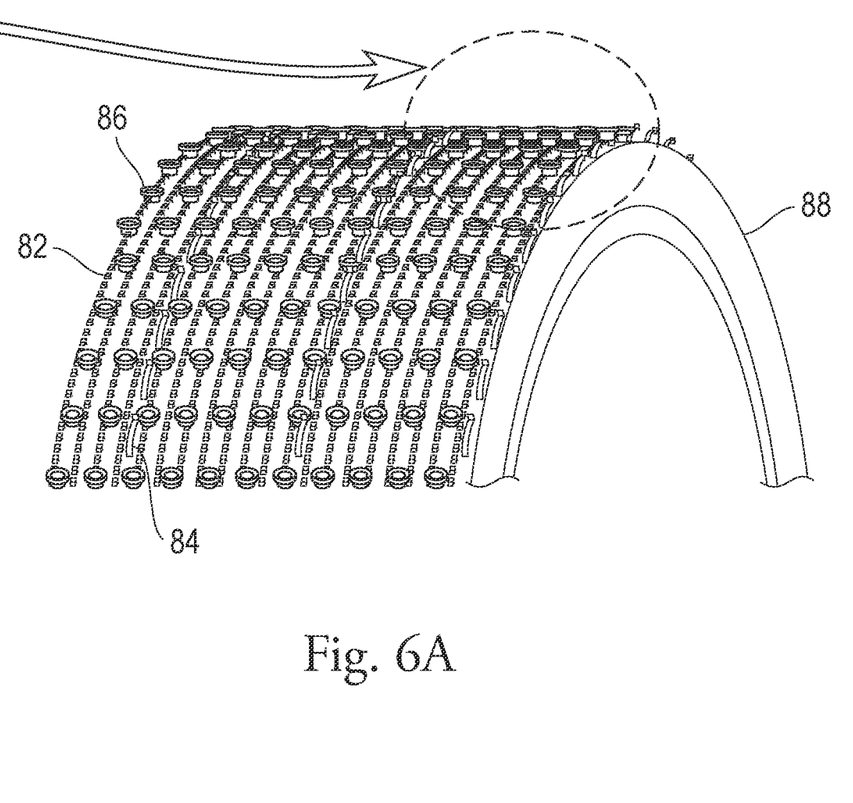
FIG. 6A is an enlarged view of a portion of the wheel of FIG. 6.
Figure 7:
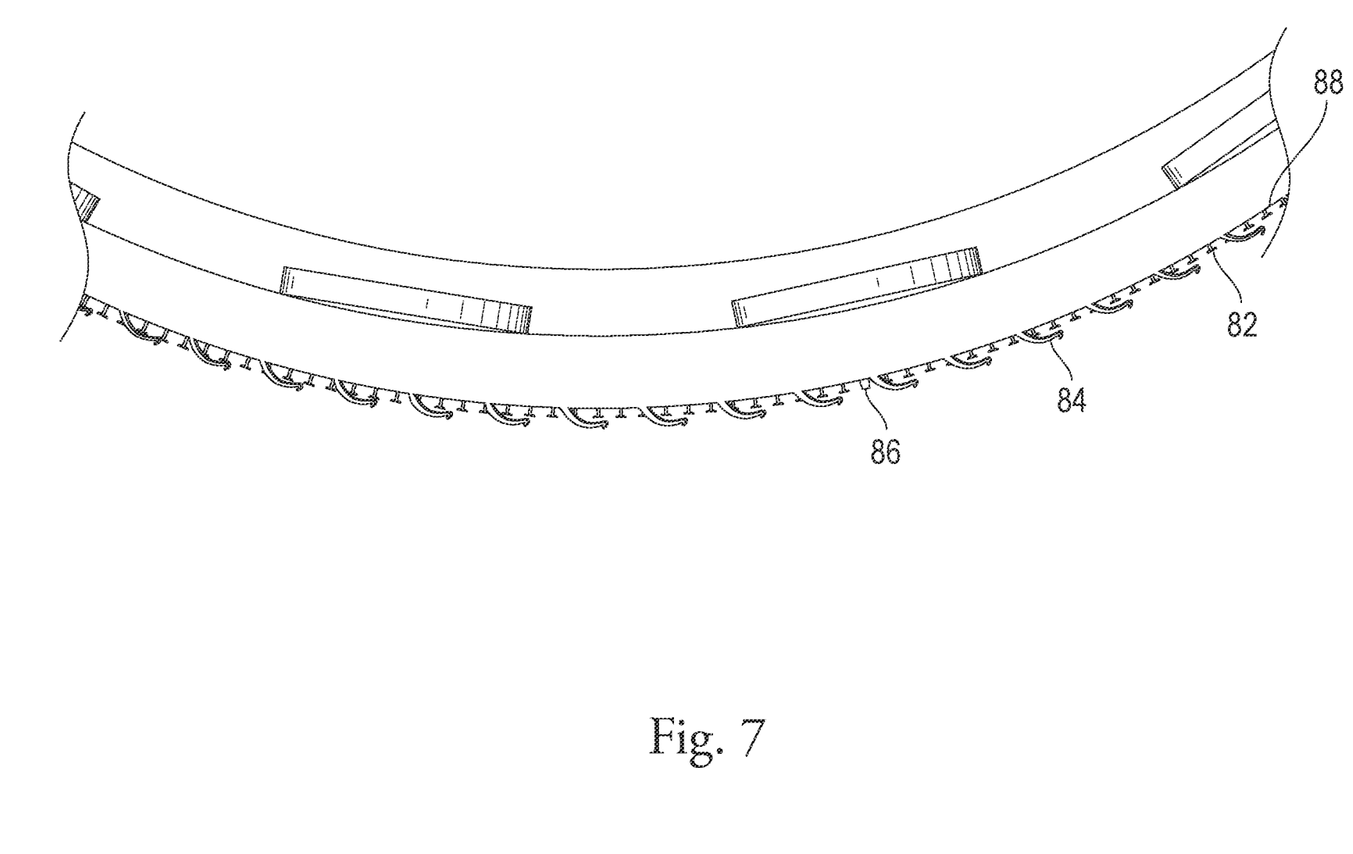
FIG. 7 is a side cross-sectional view of a portion of the wheel of FIG. 6.

As shown in FIGS. 6-7, a transport assembly 80, such as a wheel, has an outer surface upon which a plurality of adhesion devices 82, 84, 86 are mounted. The adhesion devices 82, 84, 86 extend in a normal or perpendicular direction from the outer surface 88 of the transport assembly 80. The adhesion device 82 can be at least one of the adhesion devices 10, 30, 50 shown in FIGS. 1-3, shaped and configured to use Van der Waals attraction, as described above. The adhesion device 84 can be the adhesion device 60 shown in FIG. 4 using a micro spine claw. The adhesion device 86 can be the adhesion device 70 shown in FIGS. 5-5A using a suction cup.

Figure 8:
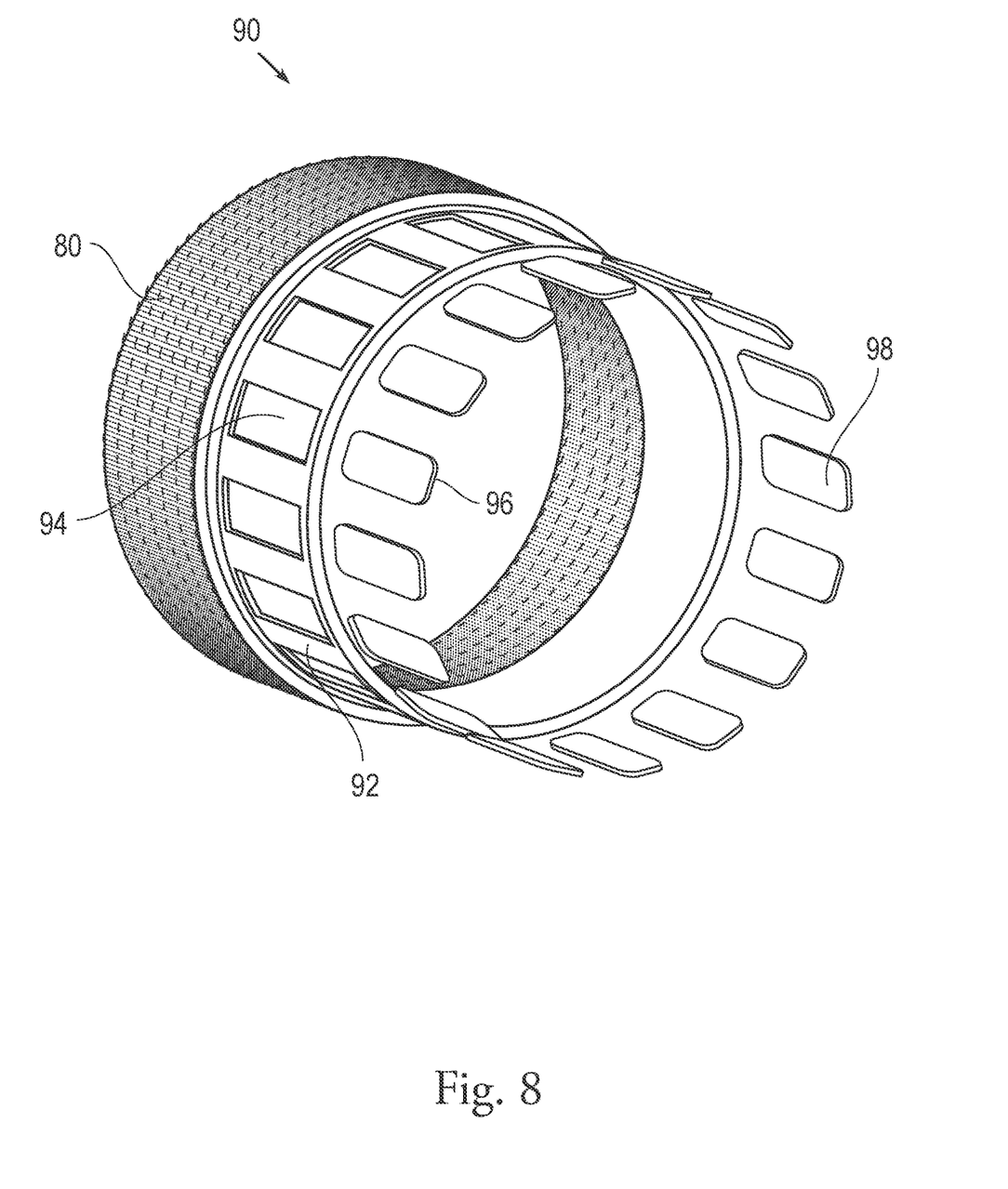
FIG. 8 is a top front side perspective view with parts separated of a wheel having the adhesion devices of FIGS. 1-5 and metallic adhesion members.
Figure 9:
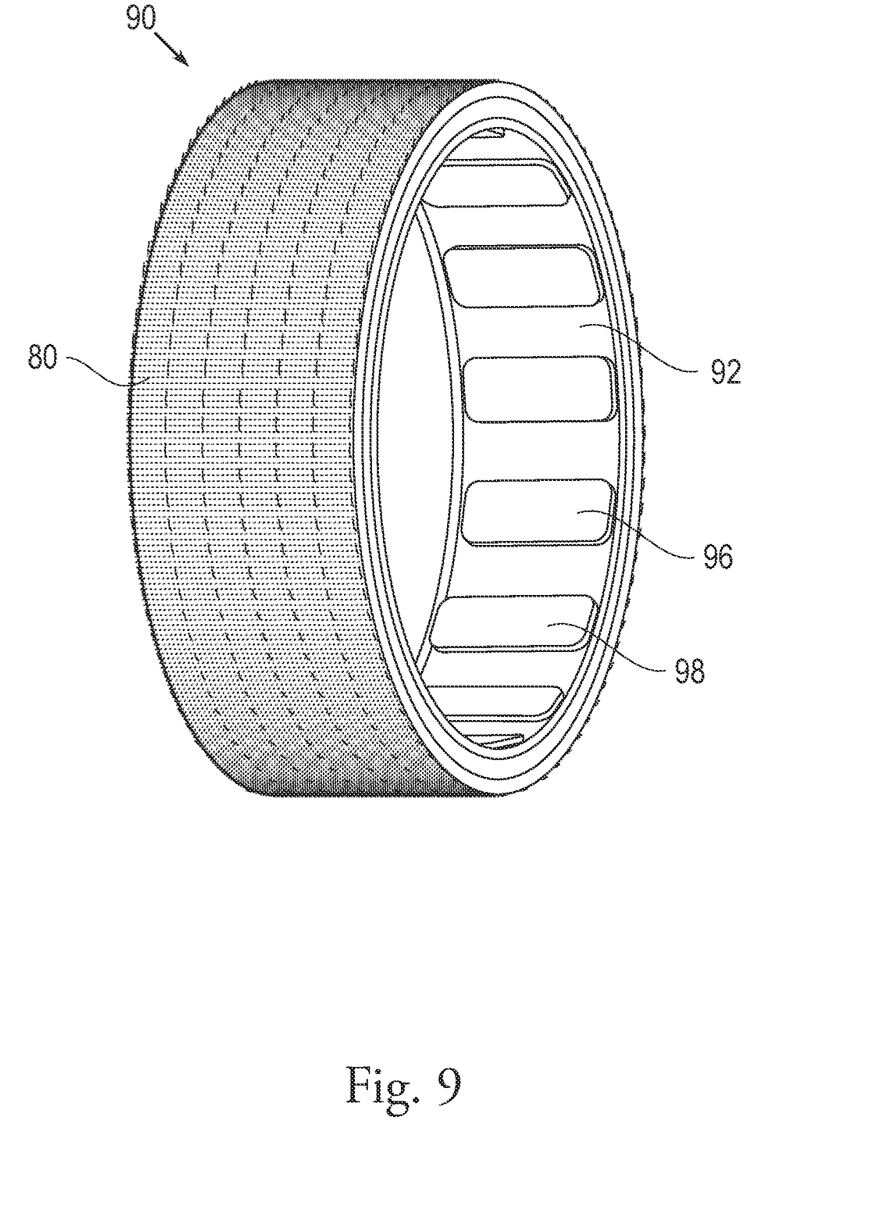
FIG. 9 is a top front side perspective view of the wheel of FIG. 8 in an assembled configuration.
Figures 10, 10A, 10B:
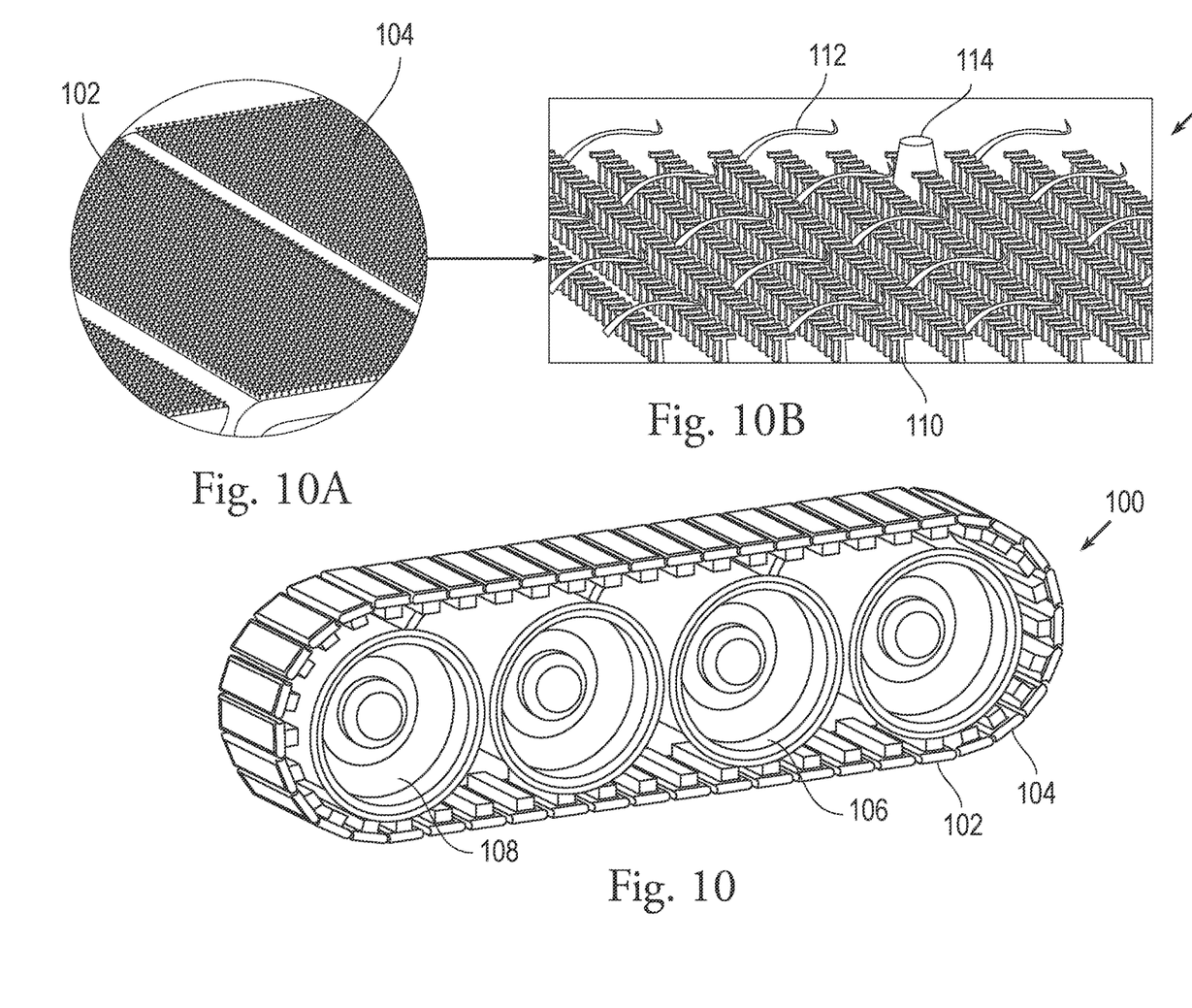
FIG. 10 is a top front side perspective view of a tractor tread assembly.
FIG. 10A is an enlarged view of a portion of the tractor tread assembly of FIG. 10.
FIG. 10B is an enlarged view of the portion in FIG. 10A.

As shown in FIGS. 8-9, in an alternative embodiment, the transport assembly 80 with releasable adhesion to non-metallic surfaces can be combined with magnetic members to constitute a transport assembly 90 which can also adhere to metallic surfaces, or to adhere to structure having both metallic and non-metallic portions. For example, a structure composed of non-metallic materials can be reinforced with metallic materials. Accordingly, the transport assembly 90 has adhesion to non-metallic surfaces with auxiliary adhesion to metallic surfaces to strengthen the adhesion of the transport assembly to the overall structure having both metallic and non-metallic portions. In one embodiment, the transport assembly 90 has the transport assembly form an outer ring, with an inner ring 92 mounted therein. The inner ring 92 has an aperture 94 which holds a magnetic adhesion device 96, 98. The magnetic adhesion device 96, 98 can be a permanent magnet. Alternatively, the magnetic adhesion device 96, 98 can be an electromagnet.

As shown in FIGS. 10-10B, in another alternative embodiment, the transport assembly 100 can be a tractor tread mechanism, having a plurality of substantially planar treads 102, 104 which move in conjunction with the rotation of at least one wheel 106, 108 in a manner known in the art. The treads 102, 104 can be planar. Alternatively, the treads 102, 104 can be curved. As shown in greater detail in FIG. 10B, each tread 102, 104 includes an adhesion device 110 which can be at least one of the adhesion devices 10, 30, 50 shown in FIGS. 1-3, using Van der Waals attraction. The adhesion device 112 can be the adhesion device 60 shown in FIG. 4 using a micro spine claw. The adhesion device 114 can be the adhesion device 70 shown in FIGS. 5-5A using a suction cup. Accordingly, the adhesion devices 110, 112, 114 on a first tread 102 provide releasable adhesion between the transport assembly 100 and the non-metallic surface. The movement of the transport assembly 100 adjacent to the non-metallic surface can then move the first tread 102 away from the non-metallic surface, while also moving the second tread 104 towards the non-metallic surface to engage and releasably adhere to the non-metallic surface. Such additional engagement of other adhesion devices 110, 112, 114 from the second tread 104 to the non-metallic surface allows the transport assembly 100 to continuously and releasably adhere to the non-metallic surface as the transport assembly 100 moves adjacent to the non-metallic surface.

Figure 11:
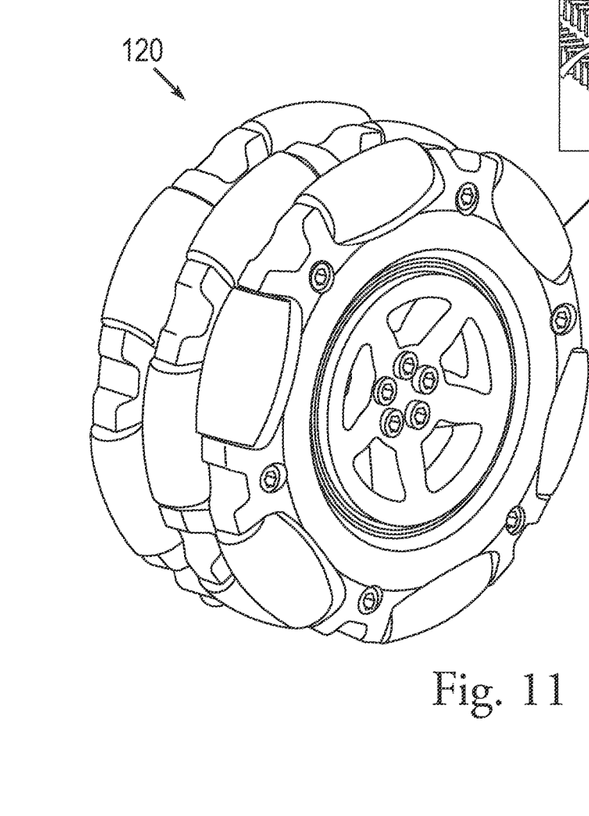
FIG. 11 is a top front side perspective view of an omni-directional wheel.
Figure 11A:
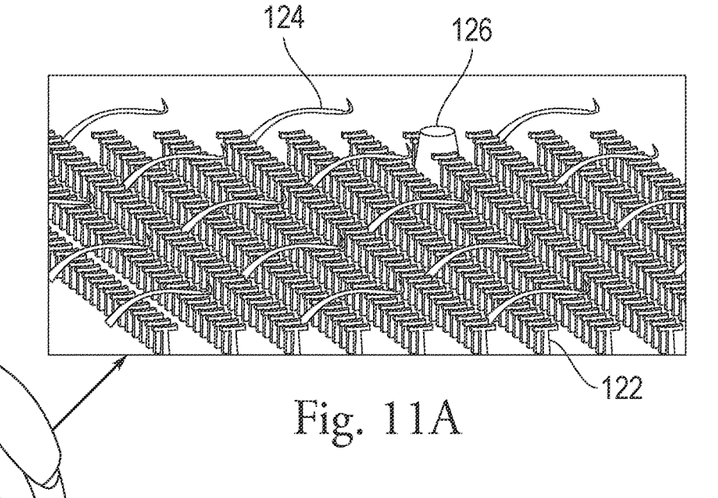
FIG. 11A is an enlarged view of the omni-directional wheel of FIG. 11.

As shown in FIGS. 11-11A, in a further alternative embodiment, the transport assembly is an omni-directional wheel or omni-wheel 120. The omni-directional wheel 120 can be a mecanum wheel. The omni-directional wheel 120 has an outer circumferential surface. The outer circumferential surface includes adhesion devices 122, 124, 126 extending in a normal or perpendicular direction from the outer circumferential surface. The adhesion device 122 can be at least one of the adhesion devices 10, 30, 50 shown in FIGS. 1-3, using Van der Waals attraction. The adhesion device 124 can be the adhesion device 60 shown in FIG. 4 using a micro spine claw. The adhesion device 126 can be the adhesion device 70 shown in FIGS. 5-5A using a suction cup. Accordingly, the adhesion devices 122, 124, 126 on a first portion of the omni-directional wheel 120 provide releasable adhesion between the omni-directional wheel 120 and the non-metallic surface. The movement of the omni-directional wheel 120 adjacent to the non-metallic surface can then move a first portion of the omni-directional wheel 120 away from the non-metallic surface, while also moving a second portion of the omni-directional wheel 120 towards the non-metallic surface to engage and releasably adhere to the non-metallic surface. Such additional engagement of other adhesion devices 122, 124, 126 from the second portion of the omni-directional wheel 120 to the non-metallic surface allows the omni-directional wheel 120 to continuously and releasably adhere to the non-metallic surface as the omni-directional wheel 120 moves adjacent to the non-metallic surface.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A transport assembly configured to move adjacent to a non-metallic surface of a structure, comprising:
    an outer surface disposed adjacent to the non-metallic surface as the transport assembly moves; and
    a plurality of adhesion devices each mounted to the outer surface and extending at least in a normal direction away from the outer surface,
    wherein each adhesion device, responsive to proximity to the non-metallic surface, is configured to adhere to the non-metallic surface,
    wherein the plurality of adhesion devices include a first adhesion device and a second adhesion device different from the first adhesion device, and
    wherein the first and second adhesion devices are selected from the group consisting of: a Van der Waals-type adhesion device, a micro spine-type adhesion device, and a suction cup-type adhesion device.

2. The transport assembly of claim 1, wherein each adhesion device is configured to releasably adhere to the non-metallic surface.

3. The transport assembly of claim 1, wherein a top surface of the Van der Waals-type adhesion device is trapezoidally shaped.

4. The transport assembly of claim 1, wherein a top surface of the Van der Waals-type adhesion device has anisotropic adhesion in a single direction.

5. The transport assembly of claim 1, wherein a top surface of the Van der Waals-type adhesion device is elliptically shaped.

6. The transport assembly of claim 1, wherein the outer surface is a portion of a tractor tread.

7. The transport assembly of claim 1, wherein the outer surface is a portion of a circumferential surface of a wheel.

8. The transport assembly of claim 7, wherein the wheel is an omni-directional wheel.

9. The transport assembly of claim 7, further comprising:
    an inner ring disposed within the circumferential surface, wherein a magnetic member is disposed on the inner ring and configured to magnetically attract a metallic surface.

10. The transport assembly of claim 9, wherein the magnetic member is a permanent magnet.

11. The transport assembly of claim 9, wherein the magnetic member is an electromagnet.

12. A wheel configured to move adjacent to a non-metallic surface of a structure, comprising:
    an outer circumferential surface disposed adjacent to the non-metallic surface as the wheel moves on the non-metallic surface; and
    a plurality of adhesion devices each mounted to the outer circumferential surface and extending at least in a normal direction away from the outer circumferential surface,
    wherein each adhesion device, responsive to proximity to the non-metallic surface, is configured to adhere to the non-metallic surface,
    wherein the plurality of adhesion devices include a Van der Waals-type adhesion device, a micro spine-type adhesion device, and a suction cup-type adhesion device.

13. The wheel of claim 12, wherein each adhesion device is configured to releasably adhere to the non-metallic surface.

14. The wheel of claim 12, wherein a top surface of the Van der Waals-type adhesion device is trapezoidally shaped.

15. The wheel of claim 12, wherein a top surface of the Van der Waals-type adhesion device has anisotropic adhesion in a single direction.

16. The wheel of claim 12, wherein a top surface of the Van der Waals-type adhesion device is elliptically shaped.

17. A tractor tread assembly configured to move adjacent to a non-metallic surface of a structure, comprising:
    a plurality of wheels;
    a plurality of tractor treads configured to move about the plurality of wheels, each tractor tread having an outer planar surface disposed adjacent to the non-metallic surface as the tractor tread assembly moves; and
    a plurality of adhesion devices each mounted to the outer planar surface and extending at least in a normal direction away from the outer planar surface,
    wherein each adhesion device, responsive to proximity to the non-metallic surface, is configured to adhere to the non-metallic surface,
    wherein the plurality of adhesion devices include a Van der Waals-type adhesion device, a micro spine-type adhesion device, and a suction cup-type adhesion device.

18. The tractor tread assembly of claim 17, wherein each adhesion device is configured to releasably adhere to the non-metallic surface.

19. The tractor tread assembly of claim 17, wherein a top surface of the Van der Waals-type adhesion device is trapezoidally shaped.

20. The tractor tread assembly of claim 17, wherein a top surface of the Van der Waals-type adhesion device is elliptically shaped.

* * * * *